Feb. 21, 1939.　　　　A. L. ELLIS, JR　　　　2,148,401
FABRIC ARTICLE AND FASTENER MEANS THEREFOR
Filed Dec. 21, 1936
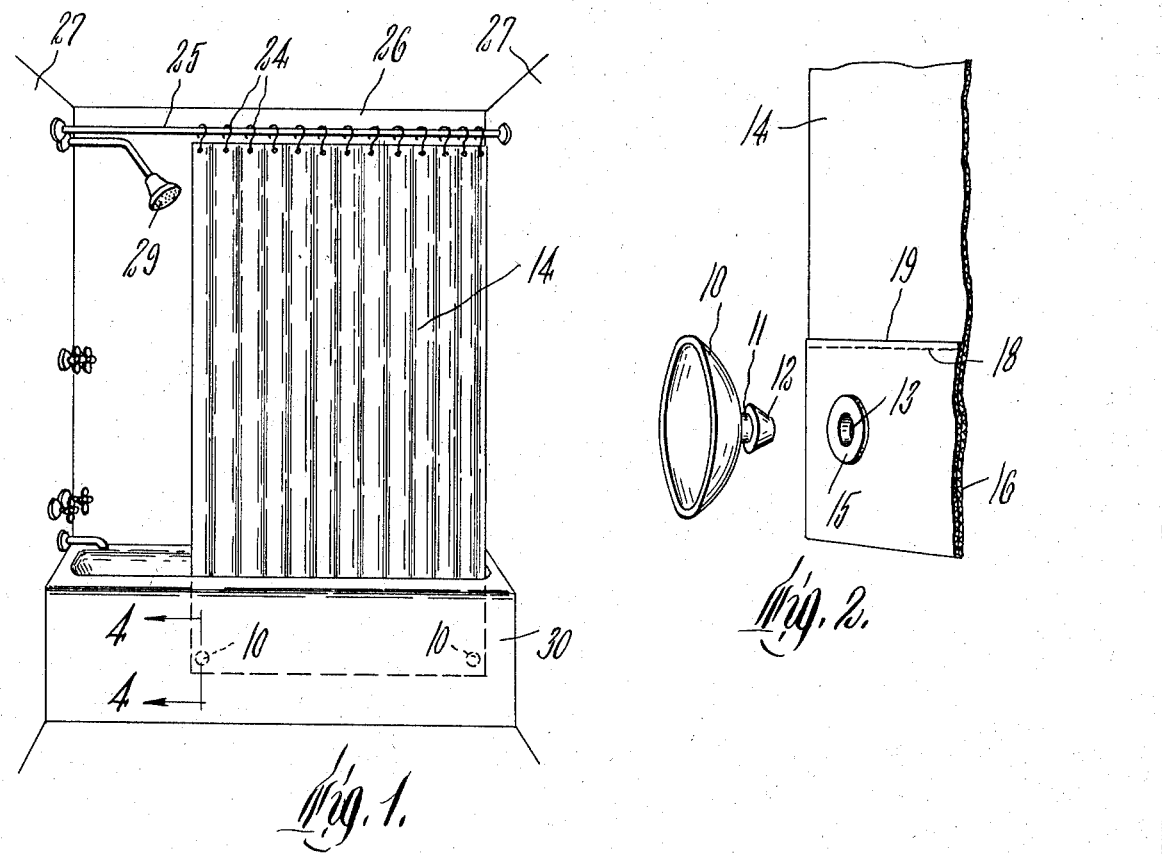
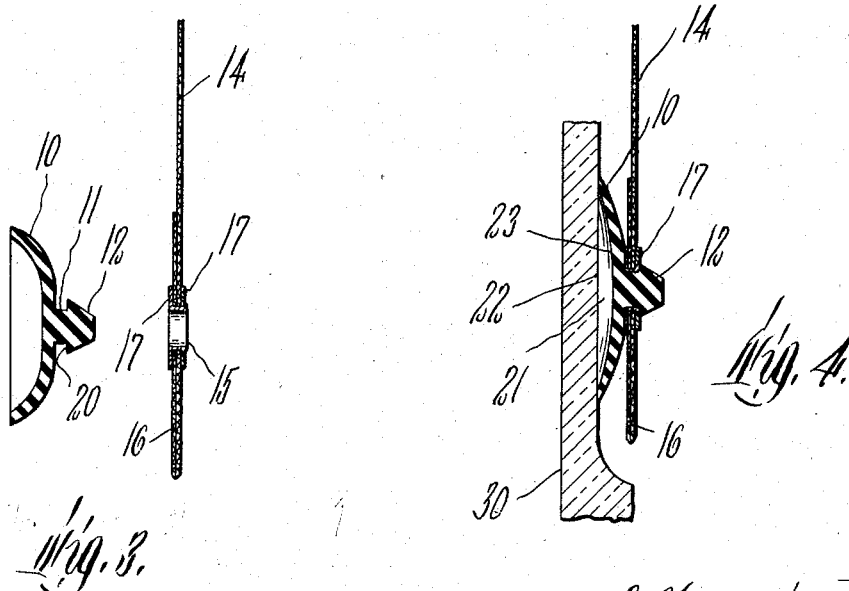
Inventor
Arthur Linwood Ellis, Jr.
by Wright, Brown, Quinby & May
Attys.

Patented Feb. 21, 1939

2,148,401

UNITED STATES PATENT OFFICE 2,148,401

FABRIC ARTICLE AND FASTENER MEANS THEREFOR

Arthur Linwood Ellis, Jr., Plymouth, Mass., assignor to Arthur L. Ellis & Co., Inc., Boston, Mass., a corporation of Massachusetts Application December 21, 1936, Serial No. 116,915

2 Claims. (Cl. 4—149)

This invention relates to a fabric article and fastener means therefor. It relates more especially to a combination of a fabric article with a fastener element capable of exerting a suctional grip on a smooth surface and thus fastening the article combined therewith to such surface.

The fastener used accordant with the present invention and adapted to be locked to and unlocked from an apertured fabric article whose aperture margins are rigid or reinforced by a metal eyelet or the like; and it consists of a cup-shaped, resilient, rubber member capable of exerting a suctional grip on a smooth surface and a resilient rubber pin projecting externally from the base of such member and including a head capable of being forced through an aperture of smaller dimensions in the article to be fastened and thus to lock the fastener to the article. Such a fastener may be molded readily and at low expense as a one-piece or unitary structure from rubber or equivalent resilient or elastic material and may serve to good advantage as means for effecting a quick and temporary fastening of an article to smooth surfaces.

More particularly, the present invention involves the interlocking of the fastener elements of the foregoing type with the lower edge portion of a shower curtain, in which connection they may serve to fix such edge portion temporarily against the wall of the bath or shower stall and thus stop leakage of water past the lower curtain edge and/or vexatious flapping or movement of the curtain such as commonly takes place during shower-bathing, especially when the curtain is of comparatively thin, light-weight, water-repellent fabric. It is hence in such field of use that the present invention will now be described with reference to the accompanying drawing, wherein,—

Figure 1 illustrates more or less diagrammatically the use of the fastener hereof for fixing the lower edge portion of a shower curtain to the wall of a combined tub and shower bath.

Figure 2 depicts in perspective the fastener hereof and a lower corner fragment of a shower curtain containing an eyeleted aperture for the reception of the locking pin of the fastener.

Figure 3 is a vertical section through the fastener and the eyeleted portion of the curtain.

Figure 4 is a section on the line 4—4 of Figure 1 showing the fastener in gripping relationship to the bath wall and its locking pin locked to the eyeleted portion of the curtain.

As appears in Figure 2, the fastener hereof consists of a cupped or cup-shaped member 10 and a locking pin 11 projecting externally from the center of its base. The pin terminates as a head or knob 12 which, as shown in Figures 3 and 4, may be of frusto-conical shape and taper toward its outer end. Such a fastener may be molded readily as a resilient or elastic unitary structure from a suitable rubber compound or its equivalent; and it is to be understood that in using the term "rubber" in describing the material of construction of the fastener I mean thereby to include rubber substitutes or other materials having the resiliency, elasticity, toughness, and other properties of rubber requisite for the fastener hereof.

In preparing a fabric article, namely, a shower curtain, for engagement by the locking pin 11 of the fastener, an aperture is formed therein of a diameter or size somewhat smaller than that of the base of the frusto-conical head or knob 12. Such an aperture 13 is shown at a lower corner hem portion 16 of the thin fabric shower curtain 14 shown in Figure 2; and the margins of the aperture are preferably reinforced or made rigid by a metal eyelet 15 whose barrel portion passes through the hem 16 and whose flanges 17 are crimped against opposite faces of the hem, which may be formed by folding the curtain fabric upwardly into two layers and uniting the two layers as by a row of stitches 18 near the margin 19 of the folded up layer.

Because of the compressibility and resiliency of the rubber head or knob 12 and its frusto-conical or tapering shape, it may be readily forced through the barrel of the eyelet, the base or larger portion of the head contracting during its passage through the smaller sized barrel and upon emerging from the barrel recovering or expanding to its normal size and shape, as shown in Figure 4. The shoulder or abutment 20 afforded between the shank of the pin and the head 12 thus engages over or against the eyelet flange 17 and serves to lock the fastener to the curtain. This locking engagement between the fastener and the curtain is a strong one that can be undone only by forcing or contracting the shoulder 20 back into the barrel of the eyelet, as by a prying instrument. It is preferable that the shank of the pin be of a diameter or size substantially equal to or slightly less than that of the eyelet barrel and that the length of the shank be substantially equal to or slightly greater than the length of the barrel so that there may be little tendency for looseness between the curtain and the locking pin 11.

In fastening the fastener hereof to a smooth surface, all that need be done is to press the edges of the cupped or cup-shaped member 10 against the smooth surface so as to flatten out such member. In so doing, the air enclosed by the cup-shaped member is expelled and when the flattening pressure is removed and the member, by virtue of its resiliency or elasticity, tends partially to recover or reassume its cup shape, as appears in Figure 4, a suction space or partial vacuum 21 is created between the smooth surface 22 against which the member was pressed and the internal wall 23 of the member. This suction tends to hold or fix the fastener and the article engaged thereby to the smooth surface. By compressing together opposite edges of the cup-shaped member 10, it is possible to break the partial vacuum and thus to free the fastener and the article enjoyed thereby from the smooth surface. The cup-shaped member then recovers its full or normal cup-shape shown in Figures 2 and 3.

Figure 1, which illustrates the use of the fastener hereof for fixing the lower edge portion of the shower curtain 14 to the bath wall, shows the upper edge portion of the curtain provided with a series of rings 24 by which the curtain is suspended from a rod 25. The curtain together with the opposite wall 26 and the end walls 27 may define the shower-bath stall or space into which water is showered or sprayed from a nozzle 29. The bottom or base of the shower bath may be afforded by a bath tub 30, as is commonly the case. Each lower corner portion of the curtain 14, whose lower edge portion projects over the smooth internal side wall surface 22 of the tub, may be interlocked with the locking pin of the fastener hereof and the cup-shaped member 10 of each fastener may be caused to exert a strong suctional grip on such wall surface and thus to fix the lower edge portion of the curtain against annoying movement during shower bathing. It might be noted that the presence of a film of moisture between the smooth wall surface of the tub and the edges of the cup-shaped member 10, such as is readily had in a bath, tends to seal the partial vacuum or suctional space 21 in the member against leakage of air thereinto. Accordingly, the fastening of the bottom edges of the curtain to the bath wall is a strong and enduring one that requires manual breakage. Should the fastener hereof lose its resiliency or elasticity after a period of use or otherwise become impaired, it may be unlocked without difficulty from the curtain and replaced by a new one.

I claim:

1. The combination with a thin, flexible, fabric shower-bath curtain containing at its lower edge portion an aperture whose margins are defined by a rigid metal eyelet clinched to said curtain, of means for fastening the lower edge portion of said curtain to the bath wall, said means consisting of a cupped, resilient, rubber member capable of exerting a suctional grip when pressed on the bath wall and a resilient, rubber pin integral with said member and projecting externally from the base thereof, said pin including a shank passing through the aperture of said curtain and a head of larger dimensions than said aperture engaging over the metal eyelet margins of said aperture and thus locking said pin to said curtain.

2. The combination with a thin, flexible fabric shower-bath curtain containing at its lower edge portion an aperture and a relatively rigid metal reinforcement at the margins of said aperture, of means for fastening the lower edge portion of said curtain to the bath wall, said means consisting of a cupped, resilient rubber member capable of exerting a suctional grip when pressed on the bath wall and a resilient rubber pin integral with said member and projecting externally from the base thereof, said pin including a shank passing through the aperture of said curtain and a head of larger dimensions than said aperture engaging over the relatively rigid reinforcement at the aperture margins and thus locking said pin to said curtain.

ARTHUR LINWOOD ELLIS, Jr.